United States Patent
Seppanen

(10) Patent No.: US 12,430,047 B2
(45) Date of Patent: *Sep. 30, 2025

(54) MAINTAINING CONTROL INFORMATION FOR STORAGE DEVICES

(71) Applicant: PURE STORAGE, INC., Santa Clara, CA (US)

(72) Inventor: Eric D. Seppanen, Mountain View, CA (US)

(73) Assignee: PURE STORAGE, INC., Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/393,118

(22) Filed: Dec. 21, 2023

(65) Prior Publication Data

US 2024/0231651 A1 Jul. 11, 2024

Related U.S. Application Data

(63) Continuation of application No. 17/489,195, filed on Sep. 29, 2021, now Pat. No. 11,868,625, which is a
(Continued)

(51) Int. Cl.
*G06F 3/00* (2006.01)
*G06F 3/06* (2006.01)
(Continued)

(52) U.S. Cl.
CPC .......... *G06F 3/0629* (2013.01); *G06F 3/0604* (2013.01); *G06F 3/0605* (2013.01);
(Continued)

(58) Field of Classification Search
CPC .... G06F 3/0629; G06F 3/0604; G06F 3/0605; G06F 3/061; G06F 3/0632; G06F 3/0659;
(Continued)

(56) References Cited

U.S. PATENT DOCUMENTS 7,975,115 B2 7/2011 Wayda et al.
8,055,893 B2 * 11/2011 Locker ................. G06F 9/4416
713/1
(Continued)

OTHER PUBLICATIONS

Hwang K., et al., "RAID-x: A New Distributed Disk Array for I/O-Centric Cluster Computing," Proceedings of the Ninth International Symposium on High-performance Distributed Computing, IEEE Computer Society, Los Alamitos, CA, Aug. 2000, pp. 279-286.
(Continued)

*Primary Examiner* — Craig S Goldschmidt

(57) ABSTRACT

Dynamically managing control information in a storage device, including: querying, by an array management module executing on a storage array controller, the storage device for a location of control information for the storage device, the control information describing the state of one or more memory blocks in the storage device; and issuing, by the array management module in dependence upon the location of the control information for the storage device, a request to retrieve the control information for the storage device.

20 Claims, 5 Drawing Sheets

Related U.S. Application Data continuation of application No. 16/436,020, filed on Jun. 10, 2019, now Pat. No. 11,137,918, which is a continuation of application No. 15/414,760, filed on Jan. 25, 2017, now Pat. No. 10,318,196, which is a continuation of application No. 14/736,240, filed on Jun. 10, 2015, now Pat. No. 9,588,691.

(51) Int. Cl.
  *G06F 12/02* (2006.01)
  *G06F 11/10* (2006.01)

(52) U.S. Cl.
  CPC ............ *G06F 3/061* (2013.01); *G06F 3/0632* (2013.01); *G06F 3/0659* (2013.01); *G06F 3/0665* (2013.01); *G06F 3/067* (2013.01); *G06F 3/0673* (2013.01); *G06F 3/0689* (2013.01); *G06F 12/0238* (2013.01); *G06F 11/1076* (2013.01); *G06F 2212/1024* (2013.01); *G06F 2212/217* (2013.01); *G06F 2212/222* (2013.01); *G06F 2212/261* (2013.01); *G06F 2212/263* (2013.01); *G06F 2212/7205* (2013.01); *G06F 2212/7207* (2013.01)

(58) Field of Classification Search
  CPC ...... G06F 3/0665; G06F 3/067; G06F 3/0673; G06F 3/0689; G06F 12/0238; G06F 11/1076; G06F 2212/1024; G06F 2212/217; G06F 2212/222; G06F 2212/261; G06F 2212/263; G06F 2212/7205; G06F 2212/7207
  See application file for complete search history.

(56) References Cited

U.S. PATENT DOCUMENTS

| | | | |
|---|---|---|---|
| 8,504,797 B2 | 8/2013 | Mimatsu | |
| 8,822,155 B2 | 9/2014 | Sukumar et al. | |
| 9,183,218 B1 * | 11/2015 | Wallace | G06F 16/1748 |
| 9,280,678 B2 | 3/2016 | Redberg | |
| 9,395,922 B2 | 7/2016 | Nishikido et al. | |
| 10,324,639 B2 | 6/2019 | Seo | |
| 10,567,406 B2 | 2/2020 | Astigarraga et al. | |
| 10,846,137 B2 | 11/2020 | Vallala et al. | |
| 10,877,683 B2 | 12/2020 | Wu et al. | |
| 11,076,509 B2 | 7/2021 | Alissa et al. | |
| 11,106,810 B2 | 8/2021 | Natanzon et al. | |
| 11,194,707 B2 | 12/2021 | Stalzer | |
| 2006/0161726 A1 * | 7/2006 | Lasser | G06F 12/0246 |
| | | | 711/E12.008 |
| 2006/0288153 A1 * | 12/2006 | Tanaka | G06F 12/0246 |
| | | | 711/E12.099 |
| 2008/0082865 A1 * | 4/2008 | Matsuoka | G11B 20/1879 |
| | | | 714/E11.062 |
| 2008/0256141 A1 | 10/2008 | Wayda et al. | |
| 2010/0306500 A1 | 12/2010 | Mimatsu | |
| 2011/0035540 A1 | 2/2011 | Fitzgerald et al. | |
| 2014/0220561 A1 | 8/2014 | Sukumar et al. | |
| 2015/0154418 A1 | 6/2015 | Redberg | |
| 2016/0026397 A1 | 1/2016 | Nishikido et al. | |
| 2016/0182542 A1 | 6/2016 | Staniford | |
| 2016/0248631 A1 | 8/2016 | Duchesneau | |
| 2017/0262202 A1 | 9/2017 | Seo | |
| 2018/0054454 A1 | 2/2018 | Astigarraga et al. | |
| 2019/0220315 A1 | 7/2019 | Vallala et al. | |
| 2020/0034560 A1 | 1/2020 | Natanzon et al. | |
| 2020/0326871 A1 | 10/2020 | Wu et al. | |
| 2021/0360833 A1 | 11/2021 | Alissa et al. | |

OTHER PUBLICATIONS

Stalzer M.A., "FlashBlades: System Architecture and Applications," Proceedings of the 2nd Workshop on Architectures and Systems for Big Data, Association for Computing Machinery, New York, NY, 2012, pp. 10-14.

Storer M.W., et al., "Pergamum: Replacing Tape with Energy Efficient, Reliable, Disk-Based Archival Storage," 6TH Usenix Conference on File and Storage Technologies (FAST'08), San Jose, CA, USA, Feb. 26-29, 2008, 16 Pages, ISBN 978-1-931971-56-0, XP002665467.

\* cited by examiner

MAINTAINING CONTROL INFORMATION FOR STORAGE DEVICES

CROSS-REFERENCE TO RELATED APPLICATIONS

This is a continuation application for patent entitled to a filing date and claiming the benefit of earlier-filed U.S. Pat. No. 11,868,625, issued Jan. 9, 2024, herein incorporated by reference in its entirety, which is a continuation of and claims priority from U.S. Pat. No. 11,137,918, issued Oct. 5, 2021, which is a continuation application of and claims priority from U.S. Pat. No. 10,318,196, issued Jun. 11, 2019, which is a continuation application of and claims priority from U.S. Pat. No. 9,588,691, issued Mar. 7, 2017.

TECHNICAL FIELD

The field of technology is methods, apparatuses, and products for dynamically managing control information in a storage device.

BACKGROUND ART

Enterprise storage systems can provide large amounts of computer storage to modern enterprises. Such computer storage can be embodied as a plurality of storage devices such as hard disk drives ('HDDs'), solid-state drives ('SSDs'), and so on. The performance of such enterprise storage systems may be negatively impacted as the storage devices are tasked with functions other than reading data and writing data. For example, the performance of such enterprise storage systems may be negatively impacted as the storage devices are tasked with performing garbage collection operations or other device management operations. As such, the storage devices may be utilizing a finite set of resources to perform device management operations that may vary at different points in time, thereby leading to users of the enterprise storage system to experience inconsistent performance at different points in time.

SUMMARY OF INVENTION

Methods, apparatuses, and products for dynamically managing control information in a storage device are disclosed. In some embodiments, dynamically managing control information in a storage device can include: querying, by an array management module executing on a storage array controller, the storage device for a location of control information for the storage device, the control information describing the state of one or more memory blocks in the storage device; and issuing, by the array management module in dependence upon the location of the control information for the storage device, a request to store the control information for the storage device.

The foregoing and other objects, features and advantages of the invention will be apparent from the following more particular descriptions of example embodiments of the invention as illustrated in the accompanying drawings wherein like reference numbers generally represent like parts of example embodiments of the invention.

DESCRIPTION OF EMBODIMENTS

Figure 1:
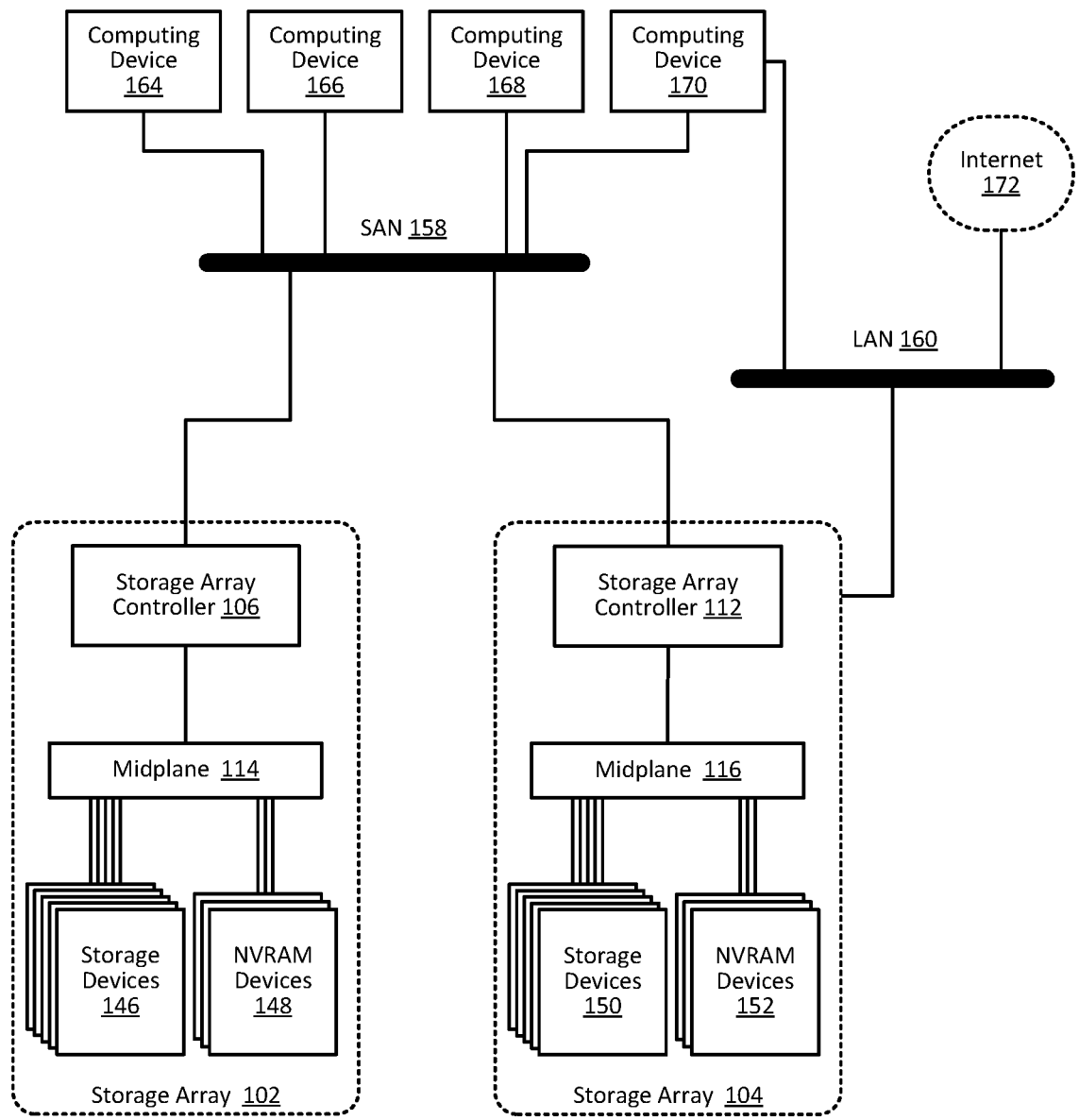
FIG. 1 sets forth a block diagram of a system configured for dynamically managing control information in a storage device according to embodiments of the present invention.

Example methods, apparatuses, and products for dynamically managing control information in a storage device in accordance with the present invention are described with reference to the accompanying drawings, beginning with FIG. 1. FIG. 1 sets forth a block diagram of a system configured for dynamically managing control information in a storage device according to embodiments of the present invention. The system of FIG. 1 includes a number of computing devices (164, 166, 168, 170). Such computing devices may be implemented in a number of different ways. For example, a computing device may be a server in a data center, a workstation, a personal computer, a notebook, or the like.

The computing devices (164, 166, 168, 170) in the example of FIG. 1 are coupled for data communications to one or more storage arrays (102, 104) through a storage area network ('SAN') (158) as well as a local area network ('LAN') (160). The SAN (158) may be implemented with a variety of data communications fabrics, devices, and protocols. Example fabrics for such a SAN (158) may include Fibre Channel, Ethernet, Infiniband, Serial Attached Small Computer System Interface ('SAS'), and the like. Example data communications protocols for use in such a SAN (158) may include Advanced Technology Attachment ('ATA'), Fibre Channel Protocol, SCSI, iSCSI, HyperSCSI, and others. Readers of skill in the art will recognize that a SAN is just one of many possible data communications couplings which may be implemented between a computing device (164, 166, 168, 170) and a storage array (102, 104), and readers will further appreciate that any other data communications coupling is well within the scope of embodiments of the present invention.

The local area network (160) of FIG. 1 may also be implemented with a variety of fabrics and protocols. Examples of such fabrics include Ethernet (802.3), wireless (802.11), and the like. Examples of such data communications protocols include Transmission Control Protocol ('TCP'), User Datagram Protocol ('UDP'), Internet Protocol ('IP'), HyperText Transfer Protocol ('HTTP'), Wireless Access Protocol ('WAP'), Handheld Device Transport Protocol ('HDTP'), Session Initiation Protocol ('SIP'), Real Time Protocol ('RTP'), and others as will occur to those of skill in the art.

The example storage arrays (102, 104) of FIG. 1 provide persistent data storage for the computing devices (164, 166, 168, 170). Each storage array (102, 104) depicted in FIG. 1 includes a plurality of storage array controllers (106, 112). Each storage array controller (106, 112) may be embodied as a module of automated computing machinery comprising computer hardware, computer software, or a combination of computer hardware and software. The storage array controllers (106, 112) may be configured to carry out various storage-related tasks. Such tasks may include writing data received from the one or more of the computing devices (164, 166, 168, 170) to storage, erasing data from storage, retrieving data from storage to provide the data to one or more of the computing devices (164, 166, 168, 170), monitoring and reporting of disk utilization and performance, performing Redundant Array of Independent Drives ('RAID') or RAID-like data redundancy operations, compressing data, encrypting data, and so on.

Each storage array controller (106, 112) may be implemented in a variety of ways, including as a Field Programmable Gate Array ('FPGA'), a Programmable Logic Chip ('PLC'), an Application Specific Integrated Circuit ('ASIC'), or computing device that includes discrete components such as a central processing unit, computer memory, and various adapters. Each storage array controller (106, 112) may include, for example, a data communications adapter configured to support communications via the SAN (158) and the LAN (160). Although only one of the storage array controllers (112) in the example of FIG. 1 is depicted as being coupled to the LAN (160) for data communications, readers will appreciate that both storage array controllers (106, 112) may be independently coupled to the LAN (160). Each storage array controller (106, 112) may also include, for example, an I/O controller or the like that couples the storage array controller (106, 112) for data communications, through a midplane (114), to a number of storage devices (146, 150), and a number of non-volatile Random Access Memory ('NVRAM') devices (148, 152).

Each NVRAM device (148, 152) may be configured to receive, from the storage array controller (106, 112), data to be stored in the storage devices (146). Such data may originate from any one of the computing devices (164, 166, 168, 170). In the example of FIG. 1, writing data to the NVRAM device may be carried out more quickly than writing data to the storage device. The storage array controller (106, 112) may be configured to effectively utilize the NVRAM devices (148, 152) as a quickly accessible buffer for data destined to be written to the storage devices. In this way, the latency for write requests may be significantly improved relative to a system in which the storage array controller writes data directly to the storage devices (146, 150).

The NVRAM devices may be implemented with computer memory in the form of high bandwidth, low latency RAM. In such an embodiment, each NVRAM device is referred to as 'non-volatile' because each NVRAM device may receive or include a unique power source that maintains the state of the RAM after main power loss to the NVRAM device (148, 152). Such a power source may be a battery, one or more capacitors, or the like. During the power loss, the NVRAM device (148, 152) may be configured to write the contents of the RAM to a persistent storage, such as the storage devices (146, 150).

A 'storage device' as the term is used in this specification refers to any device configured to record data persistently. The term 'persistently' as used here refers to a device's ability to maintain recorded data after loss of a power source. Examples of storage devices may include mechanical, spinning hard disk drives, solid-state drives ("Flash drives"), and the like.

The storage array controllers (106, 112) of FIG. 1 may be configured for dynamically managing control information in a storage device (146, 150) according to embodiments of the present invention. In the example depicted in FIG. 1, the control information can describe the state of one or more memory blocks in the storage device (146, 150). The control information may indicate, for example, that a particular memory block has failed and should no longer be written to, that a particular memory block contains boot code for a storage array controller (106, 112), the number of program-erase ('P/E') cycles that have been performed on a particular memory block, the age of data stored in a particular memory block, the type of data that is stored in a particular memory block, and so on.

In the example depicted in FIG. 1, the control information for the storage device (146, 150) may be stored in one or more particular memory blocks of the storage device (146, 150) that are selected by the storage array controller (106, 112). The selected memory blocks may be tagged with a special identifier indicating that the selected memory block contains control information. The special identifier may be utilized by the storage device (146, 150) to quickly identify those memory blocks that contain control information, for example, by the storage device (146, 150) issuing a special command to locate memory blocks that contain control information. Readers will further appreciate that the control information may be so large that segments of the control information may be stored in multiple locations, the control information may be stored in multiple locations for redundancy purposes, or the control information may otherwise be distributed across multiple memory blocks in the storage device (146, 150).

The storage array controllers (106, 112) may dynamically manage control information in a storage device (146, 150) by querying the storage device (146, 150) for a location of control information for the storage device (146, 150). Querying the storage device (146, 150) for the location of control information for the storage device (146, 150) may be carried out, for example, by the storage array controller (106, 112) causing a message of a predetermined format to be sent from the storage array controller (106, 112) to the storage device (146, 150). Such a message may include a request for the location of control information for the storage device (146, 150). In such an example, the storage device (146, 150) may be configured to respond to such messages by sending a response message that includes the location of control information for the storage device (146, 150).

The storage array controllers (106, 112) may further dynamically manage control information in a storage device (146, 150) by issuing, in dependence upon the location of the control information for the storage device (146, 150), a request to retrieve the control information for the storage device (146, 150). The request to retrieve the control information for the storage device (146, 150) may be embodied, for example, as one or more messages that are sent from the storage array controller to the storage device (146, 150). Issuing a request to retrieve the control information for the storage device (146, 150) may therefore be carried out, for example, by the storage array controller (106, 112) causing a message of a predetermined format to be sent from the storage array controller (106, 112) to the storage device (146, 150). Such a message may include the location of the control information for the storage device (146, 150) and any other useful information. In such an example, the storage device (146, 150) may be configured to respond to such messages by sending the control information to the storage array controller (106, 112).

The arrangement of computing devices, storage arrays, networks, and other devices making up the example system illustrated in FIG. 1 are for explanation, not for limitation. Systems useful according to various embodiments of the present invention may include different configurations of servers, routers, switches, computing devices, and network architectures, not shown in FIG. 1, as will occur to those of skill in the art.

Dynamically managing control information in a storage device in accordance with embodiments of the present invention is generally implemented with computers. In the system of FIG. 1, for example, all the computing devices (164, 166, 168, 170) and storage controllers (106, 112) may be implemented to some extent at least as computers. For further explanation, therefore, FIG. 2 sets forth a block diagram of a storage array controller (202) useful for dynamically managing control information in a storage device according to embodiments of the present invention.

Figure 2:
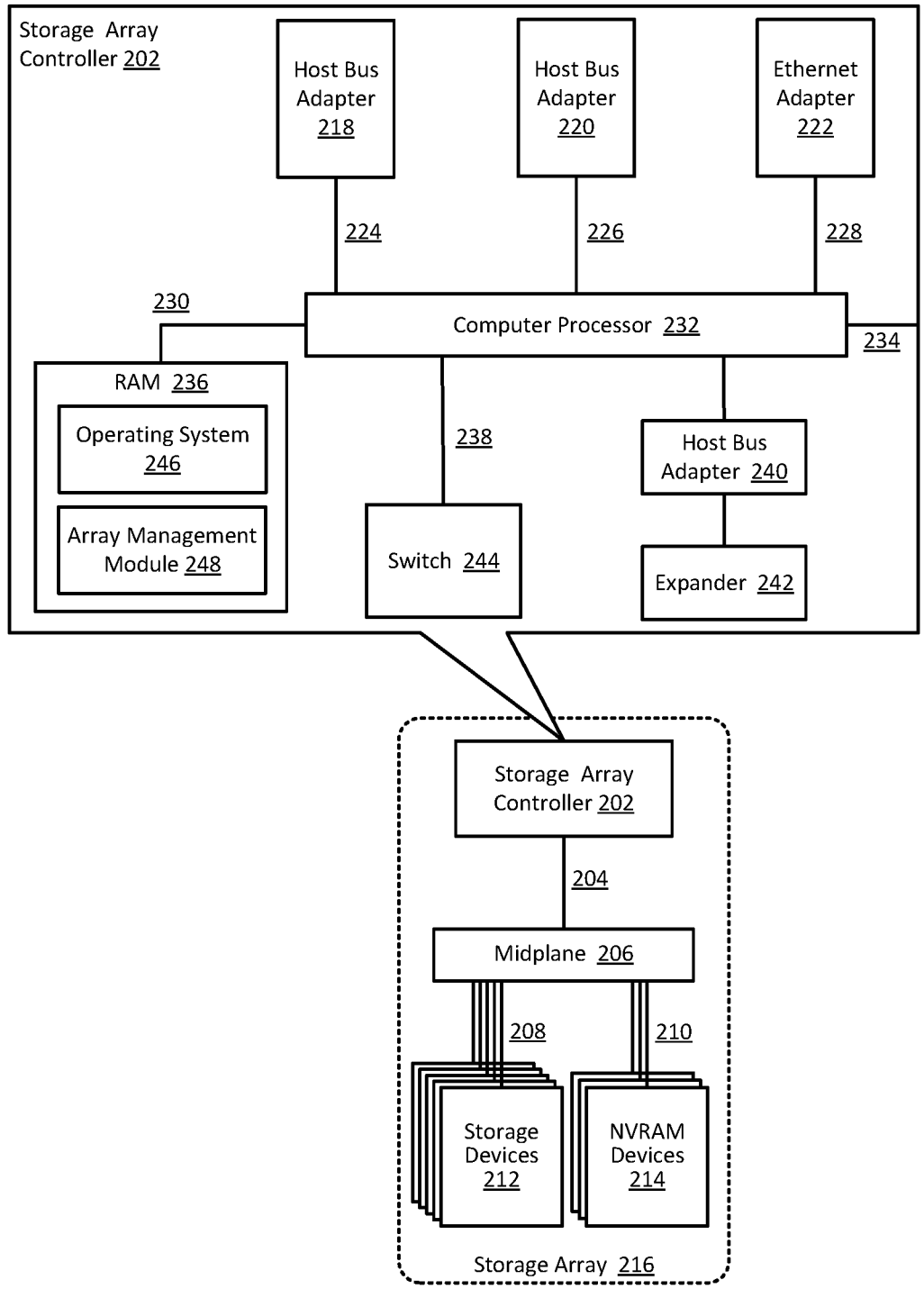
FIG. 2 sets forth a block diagram of an example storage array controller useful in dynamically managing control information in a storage device according to embodiments of the present invention.

The storage array controller (202) of FIG. 2 is similar to the storage array controllers depicted in FIG. 1, as the storage array controller (202) of FIG. 2 is communicatively coupled, via a midplane (206), to one or more storage devices (212) and to one or more NVRAM devices (214) that are included as part of a storage array (216). The storage array controller (202) may be coupled to the midplane (206) via one or more data communications links (204) and the midplane (206) may be coupled to the storage devices (212) and the NVRAM devices (214) via one or more data communications links (208, 210). The data communications links (204, 208, 210) of FIG. 2 may be embodied, for example, as Peripheral Component Interconnect Express ('PCIe') bus.

The storage array controller (202) of FIG. 2 includes at least one computer processor (232) or 'CPU' as well as random access memory ('RAM') (236). The computer processor (232) may be connected to the RAM (236) via a data communications link (230), which may be embodied as a high speed memory bus such as a Double-Data Rate 4 ('DDR4') bus.

Stored in RAM (214) is an operating system (246). Examples of operating systems useful in storage array controllers (202) configured for dynamically managing control information in a storage device according to embodiments of the present invention include UNIX™, Linux™, Microsoft Windows™, and others as will occur to those of skill in the art. Also stored in RAM (236) is an array management module (248), a module of computer program instructions for dynamically managing control information in a storage device according to embodiments of the present invention. The functionality of the array management module (248) will be described in greater detail below, but readers will appreciate that while the array management module (248) and the operating system (246) in the example of FIG. 2 are shown in RAM (168), many components of such software may also be stored in non-volatile memory such as, for example, on a disk drive, on a solid-state drive, and so on.

The storage array controller (202) of FIG. 2 also includes a plurality of host bus adapters (218, 220, 222) that are coupled to the processor (232) via a data communications link (224, 226, 228). Each host bus adapter (218, 220, 222) may be embodied as a module of computer hardware that connects the host system (i.e., the storage array controller) to other network and storage devices. Each of the host bus adapters (218, 220, 222) of FIG. 2 may be embodied, for example, as a Fibre Channel adapter that enables the storage array controller (202) to connect to a SAN, as an Ethernet adapter that enables the storage array controller (202) to connect to a LAN, and so on. Each of the host bus adapters (218, 220, 222) may be coupled to the computer processor (232) via a data communications link (224, 226, 228) such as, for example, a PCIe bus.

The storage array controller (202) of FIG. 2 also includes a host bus adapter (240) that is coupled to an expander (242). The expander (242) depicted in FIG. 2 may be embodied as a module of computer hardware utilized to attach a host system to a larger number of storage devices than would be possible without the expander (242). The expander (242) depicted in FIG. 2 may be embodied, for example, as a SAS expander utilized to enable the host bus adapter (240) to attach to storage devices in an embodiment where the host bus adapter (240) is embodied as a SAS controller.

The storage array controller (202) of FIG. 2 also includes a switch (244) that is coupled to the computer processor (232) via a data communications link (238). The switch (244) of FIG. 2 may be embodied as a computer hardware device that can create multiple endpoints out of a single endpoint, thereby enabling multiple devices to share what was initially a single endpoint. The switch (244) of FIG. 2 may be embodied, for example, as a PCIe switch that is coupled to a PCIe bus (238) and presents multiple PCIe connection points to the midplane (206).

The storage array controller (202) of FIG. 2 also includes a data communications link (234) for coupling the storage array controller (202) to other storage array controllers. Such a data communications link (234) may be embodied, for example, as a QuickPath Interconnect ('QPI') interconnect.

Readers will recognize that these components, protocols, adapters, and architectures are for illustration only, not limitation. Such a storage array controller may be implemented in a variety of different ways, each of which is well within the scope of the present invention.

Figure 3:
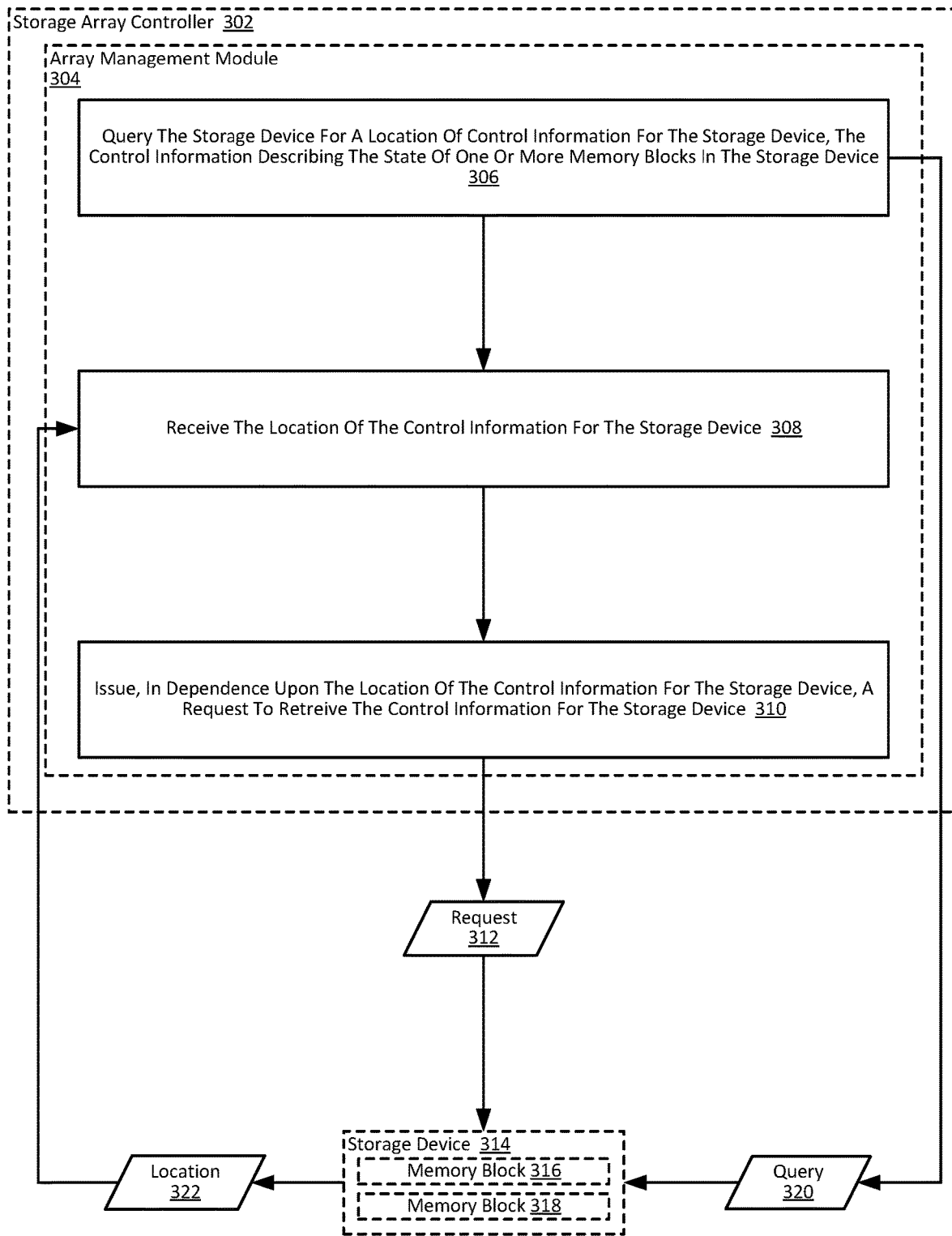
FIG. 3 sets forth a flow chart illustrating an example method for dynamically managing control information in a storage device according to embodiments of the present invention.

For further explanation, FIG. 3 sets forth a flow chart illustrating an example method for dynamically managing control information in a storage device (314) according to embodiments of the present invention. The control information for the storage device (314) describes the state of one or more memory blocks (316, 318) in the storage device (314). The control information may indicate, for example, that a particular memory block has failed and should no longer be written to, that a particular memory block contains boot code for the storage array controller (302), the number of P/E cycles that have been performed on a particular memory block, the age of data stored in a particular memory block, the type of data that is stored in a particular memory block, and so on.

In the example method depicted in FIG. 3, the control information for the storage device (314) may be stored in a particular memory block (316, 318) of the storage device (314) that is selected by the storage array controller (302). After the storage array controller (302) has selected a particular memory block (316, 318) to store control information, the selected memory block (316, 318) may be tagged with a special identifier indicating that the selected memory block (316, 318) contains control information. Tagging the selected memory block (316, 318) with a special identifier indicating that the selected memory block (316, 318) contains control information may be carried out, for example, by storing the special identifier in a header associated with the selected memory block (316, 318) that is reserved for storing metadata associated with the selected memory block (316, 318). Readers will appreciate that although control information may be so large that segments of the control information may be stored in multiple locations, the control information may be stored in multiple locations for redundancy purposes, or the control information may otherwise be distributed across multiple memory blocks (316, 318) in the storage device (314).

The example method depicted in FIG. 3 is carried out, at least in part, by an array management module (304) executing on a storage array controller (302). The storage array controller (302) of FIG. 3 may be similar to the storage array controllers described above with reference to FIG. 1 and FIG. 2, as the storage array controller (302) may include computer hardware such as a CPU for processing computer program instructions, as well as computer memory for storing computer program instructions, data, and the like. As such, the array management module (304) of FIG. 3 may be embodied, for example, as a module of computer program instructions stored in computer memory in the storage array controller (302) that are executed on computer hardware such as a CPU in the storage array controller (302).

The example method depicted in FIG. 3 includes querying (306), by the array management module (304) executing on the storage array controller (302), the storage device (314) for the location (322) of control information for the storage device (314). Querying (306) the storage device (314) for the location (322) of control information for the storage device (314) may be carried out, for example, by the array management module (304) causing a message of a predetermined format to be sent from the storage array controller (302) to the storage device (314). Such a message may include a request for the location (322) of control information for the storage device (314).

In such an example, the storage device (314) may be configured to execute special purpose instructions that enable the storage device (314) to identify the location (322) of control information for the storage device (314). Such special purpose instructions may be executed by a controller on the storage device (314) and may cause the storage device (314) to scan a portion of each memory block to identify those memory blocks that house control information for the storage device (314). The storage device (314) may subsequently send a response message to the storage array controller (302) that includes the location (322) of control information for the storage device (314). As such, the example method depicted in FIG. 3 includes the array management module (304) receiving (308) the location (322) of control information for the storage device (314). In the example method depicted in FIG. 3, querying (306) the storage device (314) for the location (322) of control information for the storage device (314) may occur during start-up of the storage array controller (302) or at any other time in accordance with embodiments of the present invention.

The example method depicted in FIG. 3 also includes issuing (310), by the array management module (304) in dependence upon the location (322) of the control information for the storage device (314), a request (312) to retrieve the control information for the storage device (314). The request (312) to retrieve the control information for the storage device (314) may be embodied, for example, as one or more messages that include the location (322) of the control information for the storage device (314), an identifier indicating that the request is a read request, and any other information needed to process the request. Issuing (310) a request (312) to retrieve the control information for the storage device (314) may therefore be carried out, for example, by the array management module (304) causing one or more messages of a predetermined format to be sent from the storage array controller (302) to the storage device (314).

Figure 4:
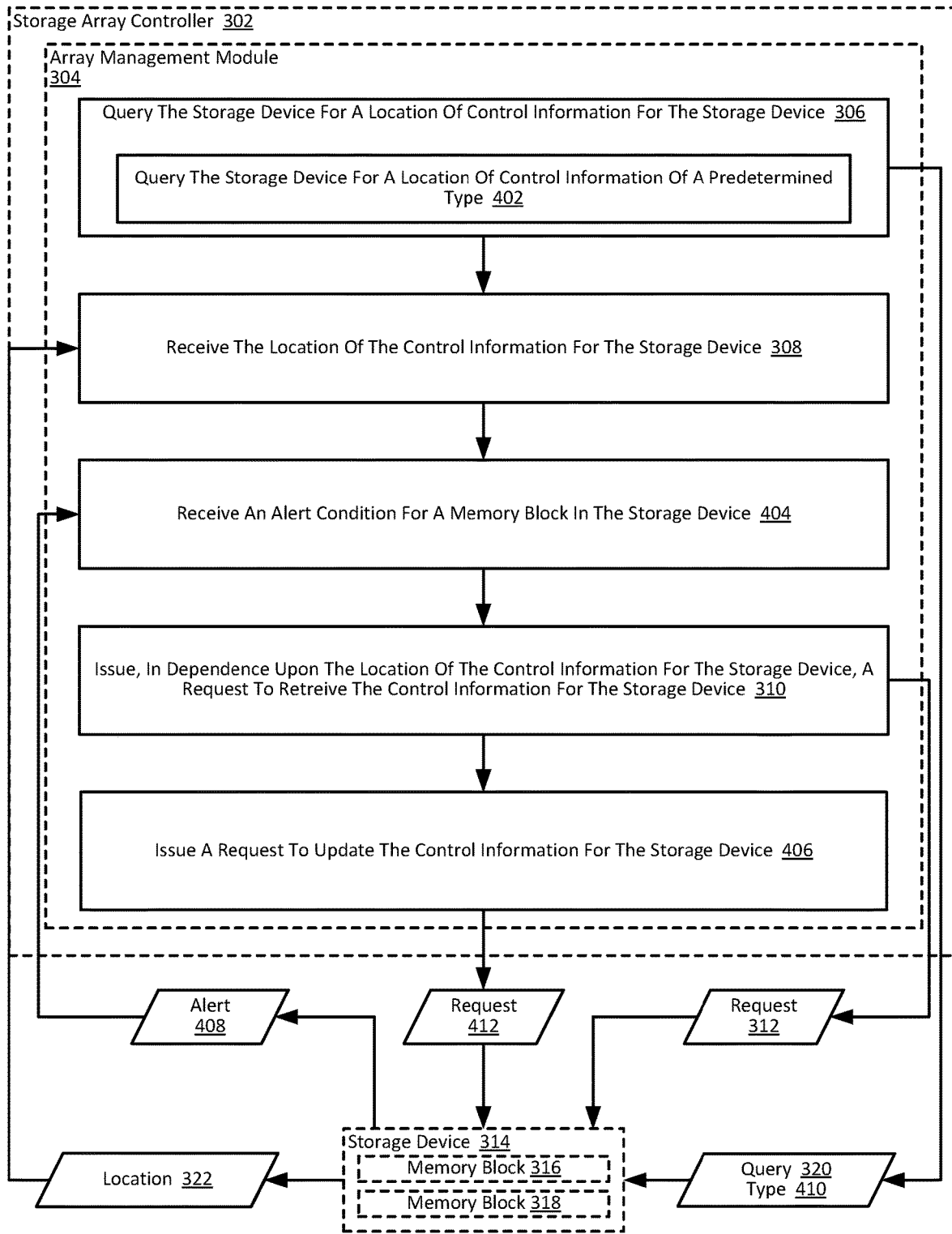
FIG. 4 sets forth a flow chart illustrating an additional example method for dynamically managing control information in a storage device according to embodiments of the present invention.

For further explanation, FIG. 4 sets forth a flow chart illustrating an additional example method for dynamically managing control information in a storage device (314) according to embodiments of the present invention. The example method depicted in FIG. 4 is similar to the example method depicted in FIG. 3, as the example method depicted in FIG. 4 also includes querying (306) the storage device (314) for a location (322) of control information for the storage device (314), receiving (308) the location (322) of the control information for the storage device (314), and issuing (310) a request to retrieve the control information for the storage device (314) in dependence upon the location (322) of the control information for the storage device (314).

In the example method depicted in FIG. 4, the storage device (314) can include control information of a plurality of types. Each type of control information represents different aspects of the state of one or more memory blocks (316, 318) in the storage device (314). For example, a first type of control information may include information describing the number of P/E cycles that have been performed on each memory block, a second type of control information may include information describing a bad block list that identifies all memory blocks in the storage device (314) that have failed, a third type of control information may include information describing the amount of time that the data currently residing in each memory block has been stored in stored in the memory block, and so on. In the example method depicted in FIG. 4, each type of control information may be associated with a unique identifier. For example, a first type of control information that describes the number of P/E cycles that have been performed on each memory block may be associated with an identifier of '1', a second type of control information that describes a bad block list may be associated with an identifier of '2', a third type of control information that describes the amount of time that the data currently residing in each memory block has been stored in stored in the memory block may be associated with an identifier of '3', and so on. Through the use of such unique identifiers, different types of control information can be distinguished from each other.

Readers will appreciate that, as described above, a particular memory block that is selected to store control information may be tagged with an identifier designating the memory block as a memory block that includes control information. Such a memory block may also be tagged with identifiers such as those described in the preceding paragraph. In such a way, a particular memory block may be tagged with information that not only indicates that control information is stored in the particular memory block, but the particular memory block may also be tagged with information that indicates the type of control information that is stored in the particular memory block.

In the example method depicted in FIG. 4, querying (306) the storage device (314) for the location (322) of control information for the storage device (314) can include querying (402) the storage device (314) for a location of control information of a predetermined type (410). Querying (402) the storage device (314) for the location of control information of the predetermined type (410) may be carried out, for example, by the array management module (304) causing a message of a predetermined format to be sent from the storage array controller (302) to the storage device (314). Such a message may include a request for the location (322) of control information for the storage device (314) as well as an identifier of the type of control information whose location is requested. In such an example, the storage device (314) may be configured to respond to such messages by sending a response message that includes the location (322) of control information of the predetermined type (410). As such, the example method depicted in FIG. 3 includes the array management module (304) receiving (308) the location (322) of control information of the predetermined type (410).

The example method depicted in FIG. 4 can include receiving (404), by the array management module (304), an alert (408) condition for a memory block (316, 318) in the storage device (314). An alert (408) condition for a memory block (316, 318) in the storage device (314) may be issued when the storage device (314) detects that a particular memory block has failed, when the storage device (314) detects that a particular memory block is failing, when the storage device (314) detects that data stored in a particular memory block has been corrupted, and so on. As such, the alert (408) condition for a memory block (316, 318) in the storage device (314) may include information such as the location of the memory block that is the subject of the alert, the type of alert condition that has been observed, and so on. The alert (408) condition for the memory block (316, 318) may be detected as part of a scheduled scan performed by the storage device (314), as part of servicing a memory access request by the storage device (314), as part of a scan performed by the storage device (314) at the behest of the storage array controller (302), or in other ways.

In the example method of FIG. 4, the array management module (304) may receive (404) the alert (408) condition for the memory block (316, 318) in the storage device (314) by receiving a message from the storage device (314). Such a message may include metadata identifying the message as an alert (408), as well as information describing the location of the memory block that is the subject of the alert, the type of alert condition that has been observed, and so on.

The example method depicted in FIG. 4 also includes issuing (406) a request (312) to update the control information for the storage device (314). Issuing (406) a request (412) to update the control information for the storage device (314) may be carried out in response to receiving (404) an alert (408) condition for a memory block (316, 318) in the storage device (314), as the control information may need to be updated to include information reflected in the alert (408). The request (412) to update the control information for the storage device (314) may be embodied, for example, as one or more messages exchanged between the storage array controller (302) and the storage device (314).

Consider an example in which the storage device (314) is embodied as an SSD, the alert (408) condition for a particular memory block (316) in the storage device (314) indicated that the particular memory block (316) has failed, and the control information includes a bad block list that is stored in a first memory block of the SSD. In such an example, the bad block list would need to be updated to add the particular memory block (316) that has failed to the bad block list. Updating the control information for the storage device (314) may therefore be carried out by the storage array controller (302) issuing a first message instructing the storage device (314) to write the updated bad block list to a second memory block in the SSD. In such an example, the second memory block may be tagged as a memory block that includes control information. The storage array controller (302) may subsequently issue a second message instructing the storage device (314) to erase the previous version of the bad block list that is stored in the first memory block of the SSD. In such an example, all information stored in the first memory block, as well as information identifying the first memory block as a memory block that stores control information, may be erased.

Readers will appreciate that 'updating' the control information for the storage device (314) can involve storing a new type of control information in the storage device (314). In such an example, the storage array controller (302) may select one or more memory blocks in the storage device (314) where the new type of control information is to be stored and the storage array controller (302) may also select an identifier to be used for the new type of control information. Through one or more messages sent from the storage array controller (302) to the storage device (314), the storage array controller (302) may cause the new type of control information to be stored in the selected memory block and may further cause the selected memory block to be tagged with the selected identifier.

Figure 5:
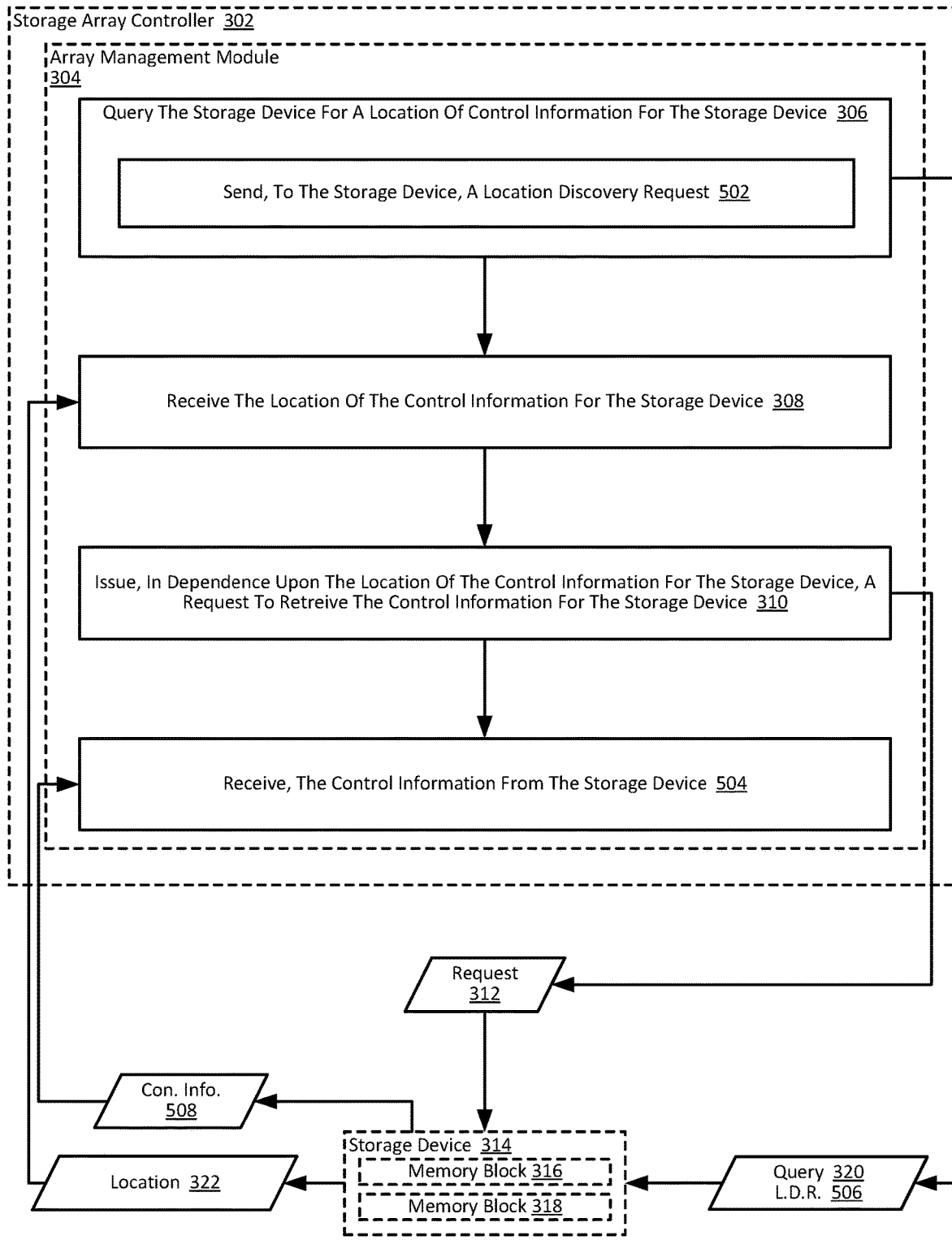
FIG. 5 sets forth a flow chart illustrating an additional example method for dynamically managing control information in a storage device according to embodiments of the present invention.

For further explanation, FIG. 5 sets forth a flow chart illustrating an additional example method for dynamically managing control information in a storage device (314) according to embodiments of the present invention. The example method depicted in FIG. 5 is similar to the example method depicted in FIG. 3, as the example method depicted in FIG. 5 also includes querying (306) the storage device (314) for a location (322) of control information for the storage device (314), receiving (308) the location (322) of the control information for the storage device (314), and issuing (310) a request to retrieve the control information for the storage device (314) in dependence upon the location (322) of the control information for the storage device (314).

In the example method depicted in FIG. 5, querying (306) the storage device (314) for a location (322) of control information for the storage device (314) can include sending (502), from the array management module (304) to the storage device (314), a location discovery request (506). The location discovery request (506) of FIG. 5 represents a special purpose instruction sent (502) from the array management module (304) to the storage device (314) instructing the storage device (314) to determine the location of control information that is stored on the storage device (314). The location discovery request (506) can be sent (502) from the array management module (304) to the storage device (314), for example, when the storage array controller (302) is powered on. In such an example, the location discovery request (506) may represent a single request to identify the location of each type of control information that is stored in the storage device (314).

Consider an example in which a primary storage controller fails, thereby causing a backup storage controller to be powered on or otherwise transitioned from an inactive state to an active state as part of a failover process. In such an example, the backup storage controller may not know the location of any control information on the storage device (314). By issuing a location discovery request (506), the backup storage controller may determine the location of all control information stored on the storage device (314).

Readers will appreciate that an array management module (304) may also send (502) a location discovery request (506) to the storage device (314) at times other than during when the storage array controller (302) is booting. For example, control information may be periodically moved, control information may grow over time to expand into additional memory blocks (316), or other actions may occur that cause the array management module (304) to send (502) a location discovery request (506) to the storage device (314). In addition, the array management module (304) may periodically send (502) a location discovery request (506) to the storage device (314) to verify the correctness of location information maintained by the array management module (304).

The example method depicted in FIG. 5 also includes receiving (504), by the array management module (304), the control information (508) from the storage device (314). Receiving (504) the control information (508) from the storage device (314) may be carried out, for example, by the array management module (304) receiving the control information (508) via one or more messages. In such an example, the storage array controller (302) may store the control information (508) in local memory of the storage array controller (302) for use by the storage array controller (302).

Consider an example in which the control information (508) is embodied as boot code used to boot the storage array controller (302) and querying (306) the storage device (314) for a location (322) of control information for the storage device (314) occurs during start-up of the storage array controller (302). In such an example, receiving (504) the control information (508) from the storage device (314) can result in the storage array controller (302) receiving boot code used to boot the storage array controller (302), which may be subsequently stored in local memory on the storage array controller (302) and executed to boot the storage array controller (302).

In an alternative example where the control information (508) includes a bad block list, receiving (504) the control information (508) from the storage device (314) can result in the storage array controller (302) receiving a bad block list which may be subsequently stored in local memory on the storage array controller (302). In such an example, as requests to write data to the storage device (314) are received by the storage array controller (302), the storage array controller (302) may utilize the bad block list to direct write accesses to memory blocks that are not on the bad block list.

Readers will appreciate that although the examples depicted in FIGS. 3-5 illustrate example methods for dynamically managing control information in a storage device where various steps are depicted as occurring in a certain order, such an ordering is not necessarily required in order to dynamically manage control information in a storage device according to embodiments of the present invention. In fact, a requirement that steps be performed in a certain order only exists where the performance of a particular step is described as occurring 'responsive to' the performance of another step. As such, the examples depicted in FIGS. 3-5 only illustrate specific embodiments for dynamically managing control information in a storage device.

Example embodiments of the present invention are described largely in the context of a fully functional computer system. Readers of skill in the art will recognize, however, that the present invention also may be embodied in a computer program product disposed upon computer readable media for use with any suitable data processing system. Such computer readable storage media may be any transitory or non-transitory media. Examples of such media include storage media for machine-readable information, including magnetic media, optical media, or other suitable media. Examples of such media also include magnetic disks in hard drives or diskettes, compact disks for optical drives, magnetic tape, and others as will occur to those of skill in the art. Persons skilled in the art will immediately recognize that any computer system having suitable programming means will be capable of executing the steps of the method of the invention as embodied in a computer program product.

Persons skilled in the art will recognize also that, although some of the example embodiments described in this specification are oriented to software installed and executing on computer hardware, nevertheless, alternative embodiments implemented as firmware, as hardware, or as an aggregation of hardware and software are well within the scope of embodiments of the present invention.

It will be understood from the foregoing description that modifications and changes may be made in various embodiments of the present invention without departing from its true spirit. The descriptions in this specification are for purposes of illustration only and are not to be construed in a limiting sense. The scope of the present invention is limited only by the language of the following claims.

What is claimed is:

1. A method comprising:
in response to receiving an alert indicating an updated state for a memory block in a storage device, querying, by a storage controller, the storage device for a location in the storage device identifiable as storing control information; and
updating, by the storage controller, the control information obtained for the storage device stored in the storage device to indicate the updated state for the memory block.

2. The method of claim 1 wherein the storage device includes control information of a plurality of types, and wherein querying the storage device further comprises querying the storage device for the location storing the control information of a predetermined type.

3. The method of claim 1 further comprising querying the storage device for the location storing the control information for the storage device during start-up of the storage controller.

4. The method of claim 1 further comprising causing the storage device to scan a portion of each memory block to identify memory blocks that comprise the control information for the storage device.

5. The method of claim 1 wherein the control information comprises an indication that the memory block contains boot code for the storage controller.

6. The method of claim 1 wherein the control information comprises an indication of a number of program-erase cycles that have been performed on the memory block.

7. The method of claim 1 wherein the control information describes a state of one or more memory blocks that are external to the location storing the control information.

8. An apparatus comprising:
a memory; and
a processor, operatively coupled to the memory, configured to:
in response to receiving an alert indicating an updated state for a memory block in a storage device, query, by a storage controller, the storage device for a location in the storage device identifiable as storing control information; and
update, by the storage controller, the control information obtained for the storage device stored in the storage device to indicate the updated state for the memory block.

9. The apparatus of claim 8 wherein the storage device includes the control information of a plurality of types and wherein the processor is further configured to query the storage device for the location storing the control information for the storage device, further comprising querying the storage device for the location storing the control information of a predetermined type.

10. The apparatus of claim 8 wherein the processor is further configured to query the storage device for the location storing the control information for the storage device during start-up of the storage controller.

11. The apparatus of claim 8 wherein the processor is further configured to scan a portion of each memory block to identify memory blocks that comprise the control information for the storage device.

12. The apparatus of claim 8 wherein the control information comprises an indication that the memory block contains boot code for the storage controller.

13. The apparatus of claim 8 wherein the control information comprises an indication of a number of program-erase cycles that have been performed on the memory block.

14. The apparatus of claim 8 wherein the control information describes the state of one or more memory blocks that are external to the location storing the control information.

15. A non-transitory computer readable storage medium storing instructions, which when executed, cause a processor to:

in response to receiving an alert indicating an updated state for a memory block in a storage device, query, by a storage controller, the storage device for a location in the storage device identifiable as storing control information; and update, by the storage controller, the control information obtained for the storage device stored in the storage device to indicate the updated state for the memory block.

16. The computer readable storage medium of claim 15 wherein the storage device includes control information of a plurality of types, and wherein the processor is further configured to:

query the storage device for the location storing the control information for the storage device further comprising querying the storage device for the location storing the control information storing a predetermined type.

17. The computer readable storage medium of claim 15 wherein the processor is further configured to:

query the storage device for the location storing the control information for the storage device during start-up of the storage controller.

18. The computer readable storage medium of claim 15 wherein the processor is further configured to scan a portion of each memory block to identify memory blocks that comprise the control information for the storage device.

19. The computer readable storage medium of claim 15 wherein the control information comprises an indication that the memory block contains boot code for the storage controller.

20. The computer readable storage medium of claim 15 wherein the control information comprises an indication of a number of program-erase cycles that have been performed on the memory block.

\* \* \* \* \*